United States Patent [19]

Dumbeck

[11] Patent Number: 4,557,084
[45] Date of Patent: Dec. 10, 1985

[54] ENERGY EFFICIENT BUILDING WITH UNDERGROUND CONCRETE WALLS

[76] Inventor: Robert F. Dumbeck, P.O. Box 548, Elgin, Tex. 78621

[21] Appl. No.: 576,433

[22] Filed: Feb. 2, 1984

[51] Int. Cl.[4] .............................................. F02D 27/32
[52] U.S. Cl. ................................. 52/169.11; 22/169.14; 22/742
[58] Field of Search ............ 52/169.14, 169.11, 169.6, 52/404, 742

[56] References Cited

U.S. PATENT DOCUMENTS

| | | | |
|---|---|---|---|
| 2,291,548 | 7/1942 | Gilman | 52/169.11 |
| 2,977,723 | 4/1961 | Rudinger | 52/169.6 |
| 4,127,973 | 12/1978 | Kachadorian | 52/169.11 |
| 4,250,670 | 2/1981 | Garner | 52/169.11 |
| 4,433,720 | 2/1984 | Lowstuter | 52/169.11 |

FOREIGN PATENT DOCUMENTS

| | | | |
|---|---|---|---|
| 970582 | 7/1975 | Canada | 52/169.11 |
| 133721 | 10/1979 | Japan | 52/169.14 |
| 2078272 | 1/1982 | United Kingdom | 52/169.6 |
| 697662 | 11/1979 | U.S.S.R. | 52/169.2 |

*Primary Examiner*—Donald G. Kelly
*Assistant Examiner*—Kathryn Ford
*Attorney, Agent, or Firm*—Laurence R. Brown

[57] ABSTRACT

Energy efficient houses are built with concrete outer walls underground in thermal contact with the earth temperature, which is at a comfortable level for human use and varies little from summer to winter. Thus, the inner concrete walls are made active energy transfer surfaces of a year around temperature control system, which in its simplest form comprises a fan circulating interior building air in a thermal exchange relationship over substantially the entire concrete inner wall surface. For even better thermal efficiency, the outer concrete walls are thermally insulated on the upper portions nearer the earth's surface, where a larger variation of temperature is encountered from summer to winter. Therefore the entire inner concrete wall thermal exchange surface may be kept typically at a temperature of 77 degrees F plus or minus 2 degrees throughout the year and thus constitute a most efficient primary source of thermal energy.

13 Claims, 1 Drawing Figure

U.S. Patent     Dec. 10, 1985     4,557,084
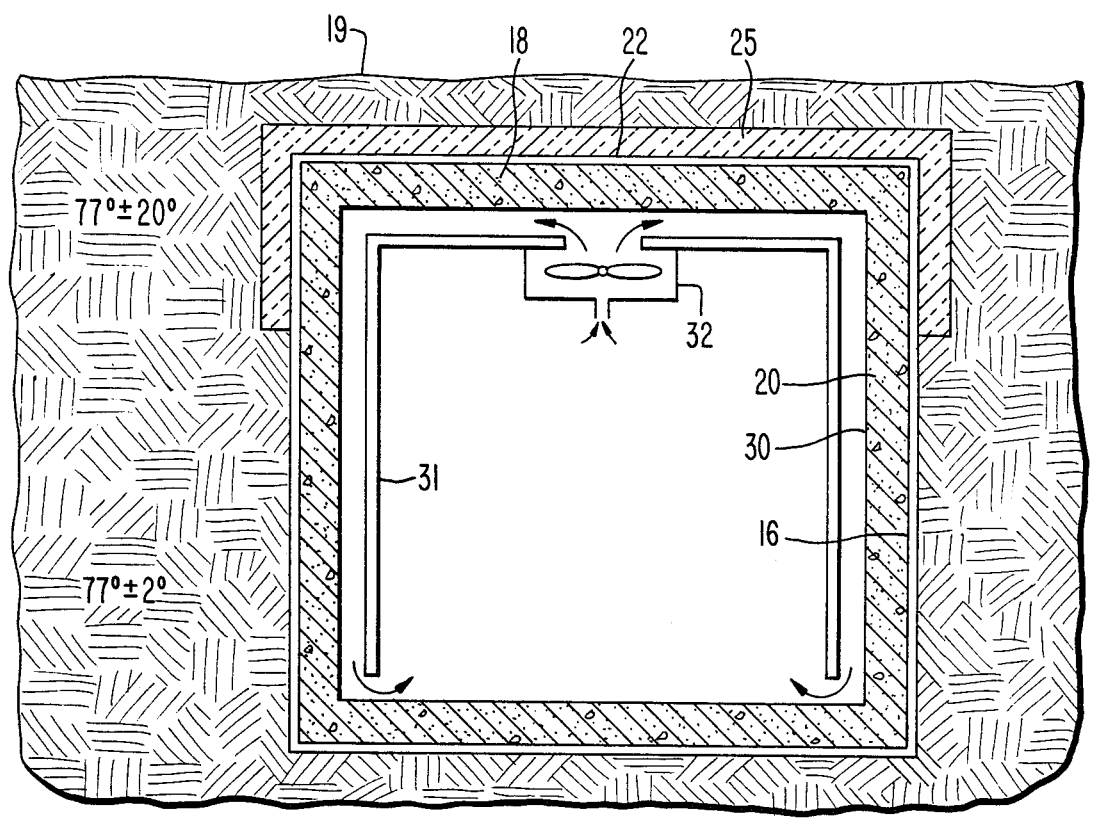

ENERGY EFFICIENT BUILDING WITH UNDERGROUND CONCRETE WALLS

TECHNICAL FIELD

This invention relates to thermal control of buildings and more particularly it relates to buildings so constructed and methods of constructing buildings for simple and efficient year around temperature control.

BACKGROUND ART

The viable building techniques are now seriously limited in nature and scope by modular pre-fab construction, which is competitive costwise in the presence of very high artisan wage levels. One most desirable low cost conventional building material that can be used in a variety of conditions with low-skilled labor is poured concrete.

However I have discovered that even with concrete, the building costs are not viable when upkeep costs are considered as well as construction costs. Particularly now with the escalating cost of energy due to the shortage of and monopolistic pricing control of fossil fuels, energy costs after construction are a significant part of viable housing costs. It is in this respect that the conventional concrete construction techniques in the building trades can no longer be competitive.

More particularly, it is to be noted that conventionally poured concrete is used primarily for basement walls only, and such basement walls are then covered with insulating, wood, sheet rock, and trapped air space insulating barriers between the concrete and the inner living space. I have discovered that this construction technique drastically increases the after construction maintenance cost of a house or equivalent building.

Thus the conventional state of the art of poured concrete as a building material is not well prepared to viably compete with modular pre-fab methods of construction on the more comprehensive cost analysis basis of both construction and post construction operating cost consideration.

Furthermore, a significant part of the real building cost need be allocated to the necessary appliances and controls, which have become very complex and costly. In particular the equipment needed conventionally for temperature control involves heater, fuel storage systems or gas pipeline connections, cooler, controls and distribution plumbing or piping, etc.

It is therefore a primary objective of this invention to find unconventional building means and methods that will permit the building trades to utilize their comprehensive resources of concrete building materials and knowhow with the labor force skilled in poured concrete building construction in a viable cost effective program considering both initial construction cost and post construction maintenance cost.

It is a further objective of this invention to overcome the aforesaid deficiencies of the building trade arts and to reduce the comprehensive costs of building, maintenance and building appliances.

DISCLOSURE OF THE INVENTION

By departing from conventional building techniques I have been able to construct low cost housing with very low post construction operating cost. Thus, by burying a larger portion, if not all, of the wall surfaces underground (including the ceiling area), the great advantage of using the underground walls as an active part of a heat pump system using the stored underground thermal energy may be realized.

This leads to further non-conventional building techniques for the purpose of optimizing the available energy and to reduce the cost of in house equipment necessary for temperature control. The underground concrete walls thus operate as both the walls and as the major source of energy and major part of the equipment for year around temperature control, thereby significantly reducing both original construction cost and after construction maintenance cost.

Furthermore, this invention provides an optimized exchange of stored underground thermal energy by way of unconventional building procedures. For this purpose the underground concrete walls on their portions closest to the earth's surface are insulated on the outside walls and good thermal exchange takes place further underground where the temperature is comfortable for human living conditions year around and varies little, typically plus or minus 2 degrees (F.).

Also unconventionally the inner concrete walls are not insulated and are left open for passing of air over substantially their entire inner wall surface which is maintained at the comfortable deep underground temperature. This permits in the simplest case for the temperature control system to be simply an air circulating fan for effective winter heating and summer air cooling control.

BRIEF DESCRIPTION OF THE DRAWING

In the single FIGURE of the drawing, there is shown in cross section format a diagrammatic sketch of a house having underground concrete walls, ceiling and floor, constructed in accordance with this invention.

THE PREFERRED EMBODIMENT

In the drawing, the sketch represents an underground house or like building, which for simplicity is shown in single room 15 form. For energy efficiency reasons, it is preferred that all the outer wall surfaces 16, including floor 17 and ceiling 18 outer surfaces are disposed under the earth's surface 19. If this is not feasible, then as much of the wall as possible is located underground. All of these walls are of poured concrete, appropriately reinforced, which are conventionally set up in forms in an excavated location into which earth is filled after completion. It is important to note for purposes of this invention that, the ceiling 18 encompasses the at least three side walls 20, which are at least substantially underground.

After about three weeks, when the poured concete is dried substantially, the outer wall surfaces 16 disposed underground are sprayed with a thin sealer coating 22 of silicone rubber compound such as, "Geocel" brand water seal 2000, which is available from Geocel Corp., Elkhart, Ind. Typically a layer of about 0.012 inch 0.028 cm) thickness will give a good moisture seal at low cost.

It is noted on the drawing that the underground temperature near the surface 19 is typically 77 degrees (F.) with a twenty degree variation summer and winter, which is a comfortable temperature for humans. However, deeper in the earth nearer the bottom portions of the side walls, the summer to winter variation is only about two degrees. Since the objectives of this invention include improvement of the thermal heating efficiency of the completed building structure, and since the swing of about eighteen degrees over summer and winter would have to be made up by external energy sources to keep the inside 15 at a constant comfortable temperature, the insulation layer 25 covers the near-surface wall area. This insulation layer 25 is preferably a layer about one-quarter inch (0.6 cm) thick silicone rubber insulating compound, such as that hereinbefore described. With this construction, good thermal contact between the outer wall surfaces 16 and the deep earth thereby establishes the concrete temperature constant year around at a desired in house temperature. For maintaining the ceiling 18 at this temperature, it is thermally bonded with the side walls, which is easily attained with poured concrete walls by the simple expedient of pouring at least the ceiling and side walls from the same batch of poured cement. It is clear therefore that the annual energy cost of any required supplemental thermal energy is substantially reduced by this construction feature.

Further, the internal wall 31 construction is nonconventional, in that the inner decorative walls 31 are so constructed that they do not cover any substantial part of the inner concrete wall surface 30, and that they form an air passageway for circulation of air by fan 32 over substantially the entire inner concrete surface.

This permits, in the simplest form, a very low cost heat pump system with the inner concrete wall surfaces being the principal active energy transfer medium, and the simple fan 32 serving to pump the energy through the house interior, as needed, preferably changing the air volume about four times per hour when there is a large differential temperature between the inner room 15 and the outside air temperature. The circulating air simply scavenges energy from the wall surfaces year around to cool in the summer and heat in the winter at very efficient energy cost.

It is therefore evident that the state of the art is improved by this invention and thus those features of novelty believed descriptive of the spirit and nature of the invention are defined with particularity in the following claims.

I claim:

1. The method of building an energy efficient house comprising the steps of:

building outer walls on the house with concrete thermally conductive from outer to inner surfaces thereof buried to a significant depth in the ground to assure that it extends to a ground depth, where the temperature change is not significantly affected by the ambient above ground air temperature with the inner wall surface within the house disposed for circulation of air thereacross, insulating the outer surface of the concrete only near the surface of the earth down to a depth at which the temperature change from summer to winter is significantly reduced, thermally contacting the outer concrete walls in good thermal exchange relationship at lower depths with the earth to establish a temperature on the inside surfaces of the concrete walls substantially that of the adjacent earth that does not significantly change from summer to winter, and employing the concrete wall inner surfaces below the insulated outer surface as an active energy exchange surface comprising the primary energy source for establishing an inside house temperature by means of the circulation of air across the wall inner surfaces, whereby the active surface is near to the human comfort zone year round and requires little external energy for heating and cooling.

2. The method defined in claim 1 including the steps of: placing substantially the entire outer wall surface of at least three walls underground, and providing an underground concrete ceiling encompassing the three walls thermally bonded with the concrete walls to thereby produce a substantially complete inner house concrete surface area maintained at the lowermost ground contact temperature as said active energy exchange surface.

3. The method defined in claim 1 including the step of exchanging energy at said energy exchange surface by circulation of air in a path passing over a substantial part of the inner concrete wall surface.

4. The method defined by claim 3 including the step of providing means for controlling the temperature inside said building year around solely by circulation of air over said path.

5. The method defined in claim 1 including the steps of water sealing said outer concrete surface after the concrete is dried substantially by spraying on a thin layer of silicone rubber compound of a thickness of about one-quarter inch (0.6 cm) thereby to maintain said good thermal exchange.

6. The method defined in claim 1 including the steps of water proofing the outside surface of the underground concrete walls after the concrete has cured for about three weeks by spraying on the walls a coating providing said good thermal exchange of about 0.012 inch (0.028 cm) thickness of a silicone rubber sealing compound.

7. The method defined in claim 1 including the step of pouring a set of side walls and a ceiling encompassing the side walls from a single batch of cement to provide a good thermal bond therebetween, thereby producing a greater area for the active energy exchange surface.

8. An energy efficient house, comprising in combination, a set of outer solid concrete walls buried to a significant depth in the ground so that the concrete wall temperature is conducted from the ground without significant change from the ambient above ground air temperature, thermal insulation on the outer surface of the concrete walls only down to a depth in the earth at which the temperature change from summer to winter is substantially reduced from that near the earth's surface, a thermal heat exchange concrete to earth interface providing a good thermal conducting relationship at the outer wall surface depths below the insulation and through the concrete keeping the inner wall surface at substantially the ground termperature, and inner wall surface construction including air circulation means employing substantially the entire inner concrete wall surface below the insulation as an active thermal energy exchange medium for maintaining house temperature substantially that of the ground temperature.

9. A house as defined in claim 8 further comprising, an underground concrete ceiling encompassing the walls and thermally bonded thereto to maintain a common temperature therewith substantially that of the earth at the level below the thermal insulation thereby to increase the thermal exchange surface area.

10. A house as defined in claim 8 including temperature control means for controlling the temperature inside said building year around with said concrete surface constituting the principal active energy transfer source therefor.

11. A house as defined in claim 10 wherein said temperature control means comprises air circulation means for circulating air in thermal contact over substantially the entire inner surface of the concrete walls.

12. A house as defined in claim 8 wherein said thermal insulation comprises a layer of silicone rubber compound of a thickness of about one-quarter inch (0.6 cm).

13. A house as defined in claim 8 wherein the outer underground concrete walls are coated with a layer of about 0.012 inch (0.028 cm) thick water sealing silicone rubber sealing compound that provides said good thermally conducting relationship.

* * * * *